UNITED STATES PATENT OFFICE.

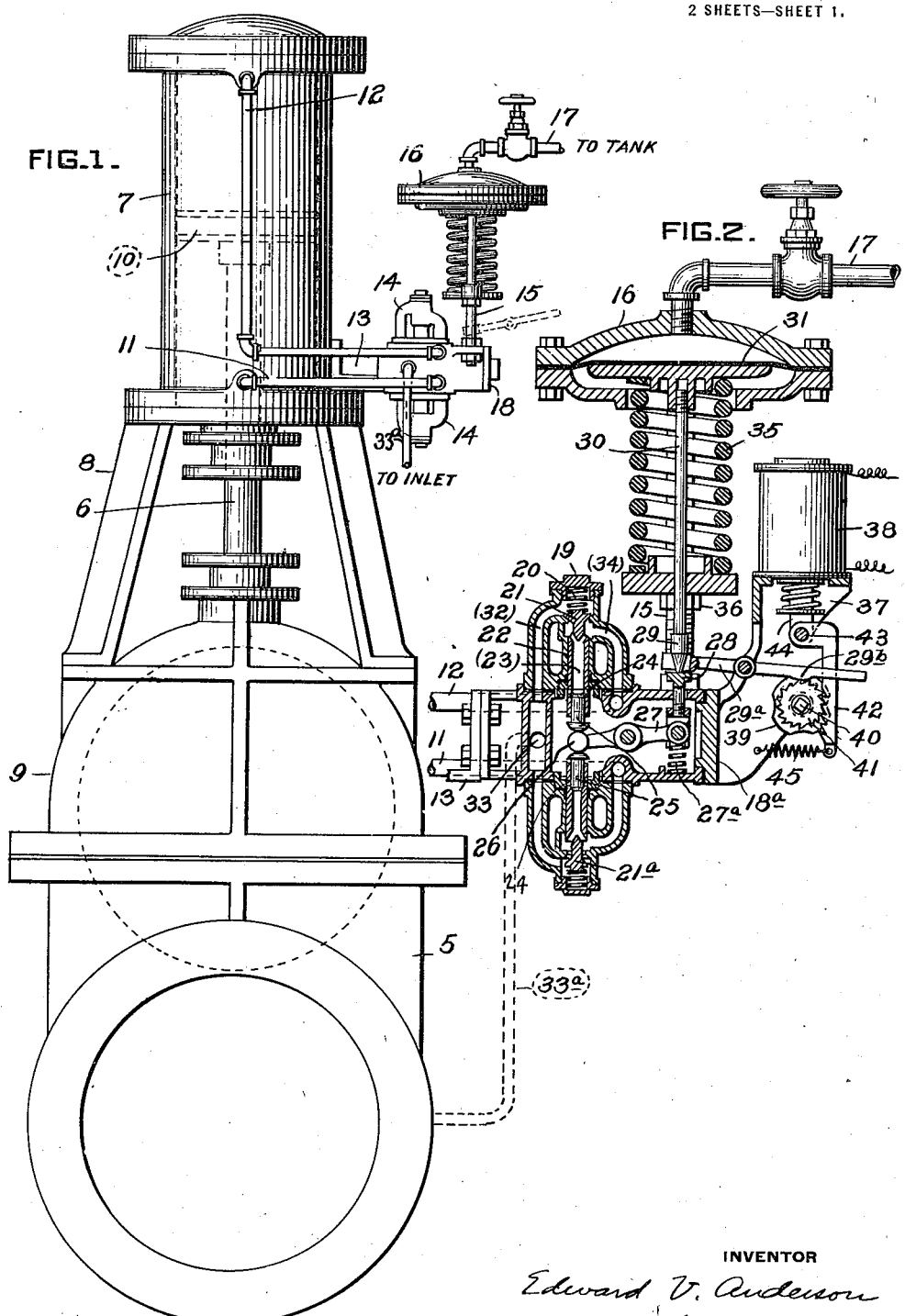

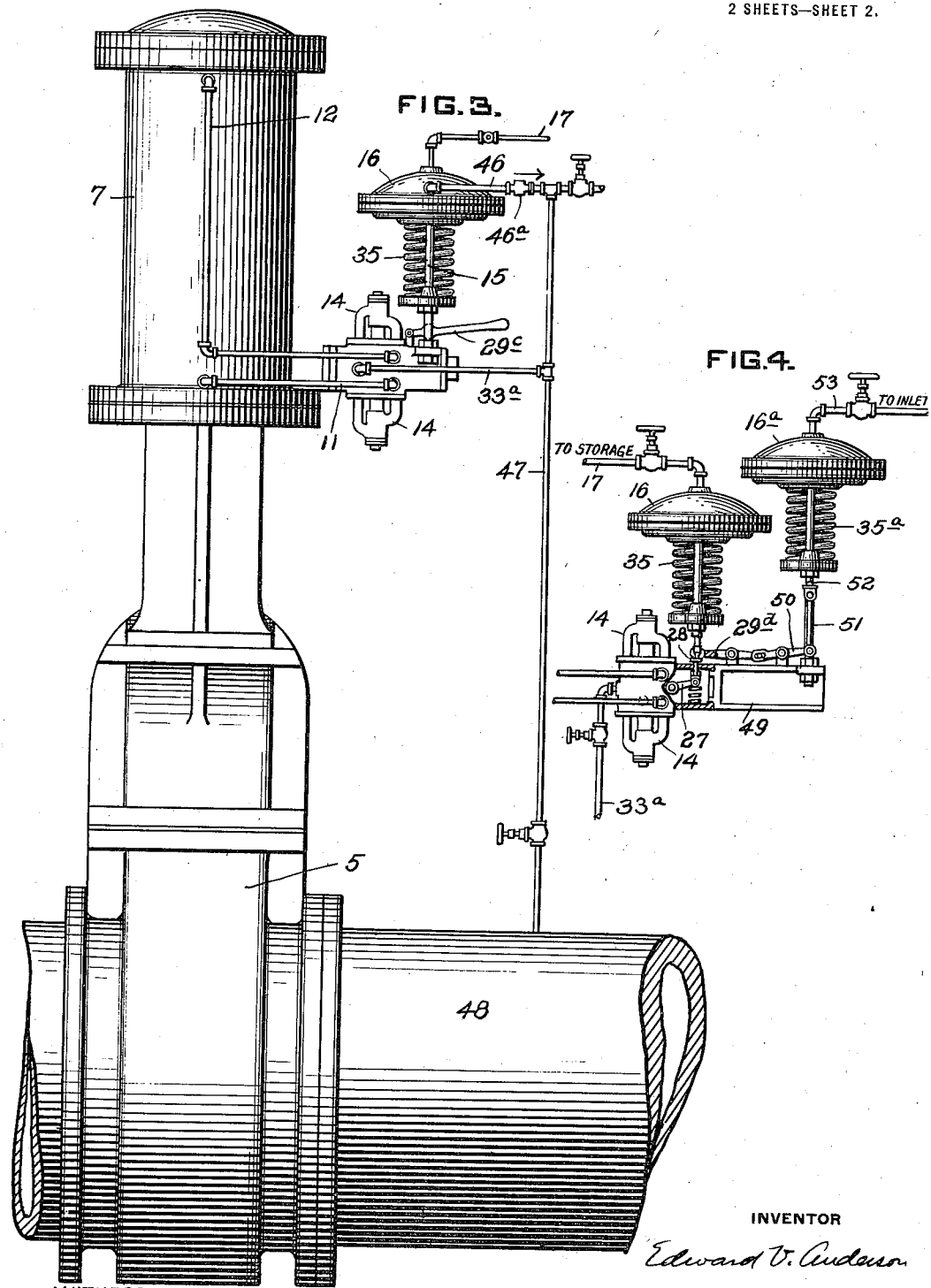

EDWARD V. ANDERSON, OF MONESSEN, PENNSYLVANIA, ASSIGNOR OF ONE-HALF TO CHARLES E. GOLDEN, OF CRAFTON, PENNSYLVANIA.

AUTOMATIC CONTROL FOR GATE-VALVES.

1,235,540. Specification of Letters Patent. Patented Aug. 7, 1917.

Application filed May 5, 1915. Serial No. 26,072.

*To all whom it may concern:*

Be it known that I, EDWARD V. ANDERSON, a citizen of the United States, residing at Monessen, in the State of Pennsylvania, have invented certain new and useful Improvements in Automatic Controls for Gate-Valves, of which the following is a specification.

My invention relates to gate valves and particularly to means of controlling large gate valves either automatically by local devices, or by ready means from a distance. The primary objects are to render certain and efficient the automatic operation, and to simplify and improve certain means for operating the controlling devices manually from a distance. Other advantages will appear hereinafter. The invention is illustrated in a preferred form and several applications in the accompanying drawings, in which:

Figure 1 is a side elevation of a large gate valve with the pilot and control attachments; Fig. 2 is a vertical central section of the controlling device of Fig. 1 with the addition of certain devices for operating from a distance; Fig. 3 is a side elevation similar to Fig. 1, but showing a different connection, and Fig. 4 is a detail showing a still further connection of the automatic control.

It is frequently desirable to close large gate valves automatically upon increase of the pressure in the distributing line beyond them, as for example in fire service. The same device which accomplishes this purpose may also control the height of water in tanks in the line, and automatically open the gate valve to allow this pressure to return through the gate valve to the distribution line whenever the pressure on the inlet side of the gate valve has dropped for any reason. Meantime it is highly desirable to add to the automatic control a device for intentionally and manually effecting its operation from a distant point, as for example by an electric switch in the superintendent's office.

In Fig. 1 I represent at 5 the casing of a large gate valve, which will be understood is a vertically moving disk attached to the stem 6, which stem extends upwardly into an operating cylinder 7 mounted on the bracket 8 on top of the hood 9 of the main valve chamber 5. This valve operating device may consist simply of the piston 10 which is subjected to pressure alternately from above or below by the pipe 11 or the pipe 12.

By means of a bracket 13 I preferably support the pilot valve casing 14 in the position shown, and it in turn may support by rods 15, the diaphragm chamber 16 connected by pipe 17 to any vessel desired on the distribution side of the main gate valve. It will be noted that the pilot valve casing 14 is in this figure closed by a screw cap 18 in place of which I may make another attachment shown in Fig. 2.

Referring now to Fig. 2, and neglecting the parts to the right of cap 18ª, it will be observed that the casing 14 is composed of two parts identically alike above and below. The casing is closed at the top by cap 19 in which is mounted a spring 20 normally holding down to its seat the pilot valve 21. The stem 22 of the pilot valve is hollow, and the passage (23) therein is in the position shown, in communication with the outer air through the small ports 24, below which is a supplemental plug valve 25 resting on the head 26 of a lever 27 pivoted to a vertically movable stud 28, and normally pushed upward by spring 27ª. On stud 28 rests the round-pointed end 29 of the operating rod 30, attached to the diaphragm 31 in the chamber 16.

On the upper side of the pilot valve 21 there is communication by a passage (32) with an opening 33, which is connected by any convenient form of pipe (33ª) to the high pressure side of the line. Below the valve 21 the passage (34) connects with the pipe 12 leading to the upper end of the gate valve operating chamber 7.

Supposing it is intended to control the height of water in a storage tank for example, the pipe 17 will be connected with that vessel and will of course exert on top of the diaphragm 31 a certain pressure whose limit is determined by the tension of the spring 35, which may be adjusted by means of the nuts 36. If this pressure rises so that the diaphragm 31 will fall, the downward movement of the rod 30 will depress stud 28, throwing up the left hand end 26 of lever 27, which will have the effect of forcing inward the upper plug valve 25, which will first operate to close the ports 24, and then will raise the hollow stem 22 of the pilot valve 21, opening communication by the passage (32) and port 33 from the high pressure, on the one side, and by the passage (34) and pipe 12 leading to the top of the valve operating chamber 7, on the other. This will of course depress the piston 10 and close the main gate valve more to supply less fluid to the tank. Meantime the head 26 of the lever 27 in rising, has released the pressure on the lower valve plug 25, allowing the lower pilot valve 21ª to take a position which will allow exhaust from the pipe 11 on the underside of the gate valve operating piston, as will be readily understood. On the contrary the lowering of the pressure in the storage tank will allow the diaphragm 31 and rod 30 to rise, and the left hand end 26 of lever 27 to be depressed, by action of spring 27ª, which will force inward the lower plug 25, and as just above described eventually effect the connection between the high pressure inlet port 33, and the pipe 11 leading to the lower end of the valve operating cylinder 7, thereby opening the gate valve wider.

It will be understood that in the apparatus so far described the presence of the lever 29ª with its head resting, along with rod 30, on stud 28, is superfluous so far as the automatic operation is concerned. But in order that, without changing the construction, the same controlling device may be operated from a distance, I replace the plug 18 at the end of the pilot valve casing 14 by plate 18ª carrying by a bracket 37, an electric solenoid 38 with connections to a distant point wherever convenient, and in this case the lever 29ª is pivoted to this bracket as shown. The right hand end of lever 29ª rests upon a cam 39 on the same square shaft 40 with a toothed wheel 41 which engages a rack 42 pivoted at 43 to the stem 44 of the solenoid core, and normally held in mesh with gear 41 by tension spring 45.

Normally the solenoid core is down, but upon exciting the coil of the solenoid it is obvious that this core will rise, lifting the rack 42, turning the gear wheel 41 and the cam 39, so that temporarily the lever 29ª will be lifted to operate the pilot valves in the manner heretofore described. A second excitation of the solenoid will again turn the gear wheel 41, and this time just sufficient to bring the knob 29ᵇ of the lever 29ª into one of the depressions in the cam 39, thus allowing the right hand end of lever 29ª to rise with the effect heretofore described as when that same happens by lifting the diaphragm rod 30.

This operation by the electric means is in no wise interfered with by the automatic operation.

In some cases it is desirable not only to maintain a given pressure on the delivery side of the gate valve, controlling the height of water in tanks, stand pipes, and reservoirs, but also to provide for automatically opening the gate valve and allow return of this water when for any reason the pressure falls on the inlet side of the gate valve. The arrangement of Fig. 3 is for this purpose. In this case, and in addition to the pipe 17 leading from the reservoir whose level is being maintained, I provide the diaphragm casing 16 with an additional outlet pipe 46 having an outward opening check valve 46ª and connected to a branch 47 leading to the inlet pipe 48 to the main valve casing 5. The double pilot valve 14 is as before described. The pipe 17 will have, for example an eighth inch opening, while the pipe 46, 47, has a much larger opening, as one half inch. The result is that the pressure coming through the pipe 17 will control when it is less than the pressure on the inlet side of the main line. But if this latter pressure falls below the desired pressure, as for instance in case of fire, where there is a large demand, then the water that enters the chamber 16 through the pipe 17 will find an outlet against a less pressure through the check valve 46ª and pipe 46, and will therefore simply flow back to the main line. This, relieving the pressure above diaphragm 31 will operate to open the gate valve fully, in the manner heretofore described, and the accumulated water in the tank may be used in the main line. A hand operating lever 29ᶜ may be provided for the pilot as shown.

In either case it is desirable to have the gate valve automatically closed when there is an increased pressure introduced into the distribution line, which usually occurs in case of fire. The apparatus arranged to provide for this is shown by the modification of Fig. 4, wherein the only change or addition to the apparatus shown in Fig. 1, is the mounting of lever 29ᵈ on a bracket 49 and connecting it with an additional lever 50, also pivoted on the bracket and connected by link 51 to the operating rod 52 of a diaphragm in the supplementary casing 16ª, entirely similar to the construction heretofore described for chamber 16, as shown in Fig. 2. This supplemental chamber is connected by pipe 53 to the inlet side of the gate valve, and the tension of the spring 35ª is so arranged that it will not depress the lever 50 (and therefore the left hand end of lever 29ᵈ), in order to operate the pilot valve lever 27, unless there is an increase of pressure in the distribution line. It will be understood that in this case the additional diaphragm operates to automatically close the main gate valve in the same way as heretofore described for the diaphragm in chamber 16. That is the valve is normally opened or closed automatically to control the height of water in the receiving reservoir, but will be closed without regard to the height of the receiving reservoir when, in emergency, the pressure in the distribution line is increased, as for fire service.

By the constructions above described, I accomplish an efficient automatic control dependent upon the height of water in the receiving reservoir; arranged for automatically closing the valve by increased pressure in the distribution line; for automatic return of the distributed water through the lines when the inlet pressure falls too low, and meantime place the valve under perfect control by electric means, from any distant point, without any waste of electric current. Other advantages of the devices will readily occur to those familiar with the art.

Having thus described my invention and illustrated its use, what I claim is the following:

1. The combination with a motor operated valve, of a governing pilot for manipulating the motor and a pressure operated device governing the pilot, and an electric device operable from a distance for operating the pilot independent of said pressure device, substantially as described.

2. The combination with a gate valve, hydraulic means for operating the gate valve, a double-acting pilot controlling said hydraulic means, a pressure regulator controlling the pilot, and a supplemental outlet adapted to interrupt the operation of the pressure regulator when the pressure falls below a given limit on the inlet side of the gate valve, substantially as described.

In testimony whereof I have hereunder signed my name.

EDWARD V. ANDERSON.